May 26, 1970     W. F. POTTS     3,514,240

FLUID FUEL IGNITION CONTROL SYSTEM

Filed July 6, 1967     3 Sheets-Sheet 1

INVENTOR.
WILLIAM F. POTTS

BY *F. P. Keiper*

ATTORNEY

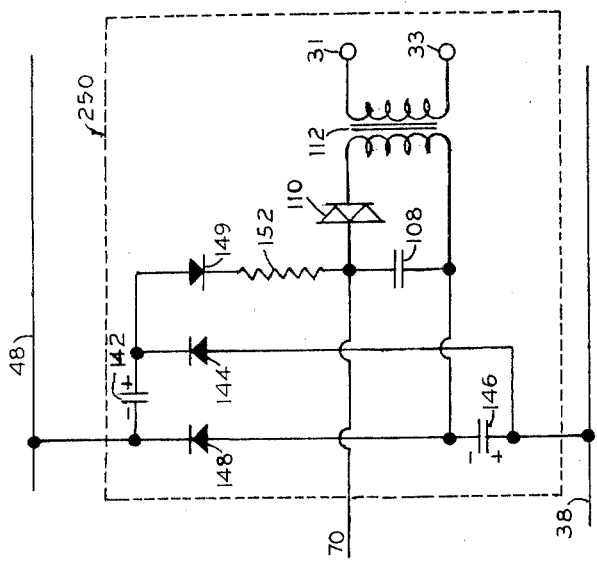
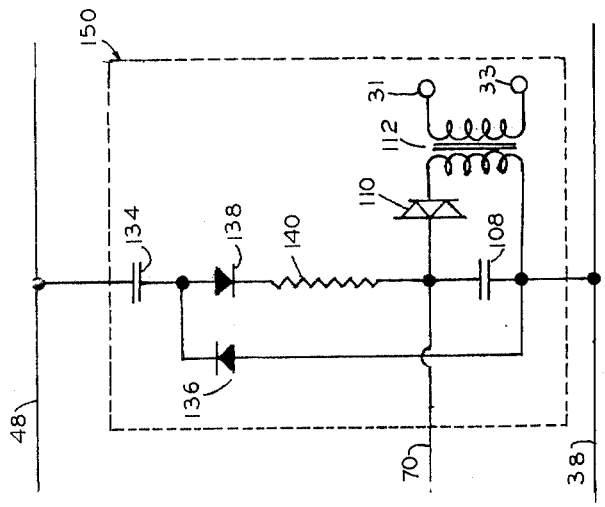

United States Patent Office 3,514,240
Patented May 26, 1970

3,514,240
FLUID FUEL IGNITION CONTROL SYSTEM
William F. Potts, Liverpool, N.Y., assignor to Liberty Combustion Corporation, Syracuse, N.Y., a corporation of New York
Filed July 6, 1967, Ser. No. 651,541
Int. Cl. F23n 5/14
U.S. Cl. 431—26                2 Claims

ABSTRACT OF THE DISCLOSURE

A control for the ignition and safe operation of a fluid fuel burner having a spark gap ignitor and a flame sensor and supplied with a fuel through an electrically operated fuel valve, and the provision of a direct current operating voltage derived from a source of alternating current voltage responsive to the closing of a thermostatically operated switch, to open the valve and to energize the ignitor in response to the direct current voltage only when the flame sensor is neither sensing flame nor defective in a manner simulating response to flame, to discontinue the operation of said ignitor in response to the flame sensor sensing flame and to allow recurrence of the operation of the ignitor when the flame sensor senses the absence of flame, and to close the valve and de-energize the ignitor upon any failure of the burner either to ignite or re-ignite before a pre-determined period of time.

---

This invention relates to fluid fuel burner ignition and control systems and particularly to systems which may be required to operate from low voltage sources of electrical power.

In many burner applications the capacity, size, and cost of the burner installation cannot reasonably warrant the use of elaborate and expensive ignition and control equipments, yet the burner must be controlled adequately and safely in all cases. Furthermore, the igniting and controlling equipment must be small, light in weight, highly reliable over years of service and inexpensive. In addition, it is often desirable from a cost standpoint to operate the ignition and control system from a low voltage alternating current source such as may be provided by a variety of commonly available transformers.

It is an object of the invention to provide a low cost ignition and control system for fluid fuel burners, relying on the use of semi-conductors and appropriate circuit components to ensure a highly reliable equipment.

It is a further object to provide an ignition and control system which will operate from a low voltage, alternating current source.

It is yet another object of the invention to employ the fewest possible components consistent with providing the necessary ignition and control functions.

A further object of the invention is to provide means for maintaining the burner in a safe condition in the event of failure of flame detection means employed in the system.

A still further object of the invention is to provide a capacitive discharge type of spark ignition generator with a minimum number of electronic components and having an inherently high reliability.

The above and other objects and novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIG. 3 is an alternative construction for a portion of the apparatus of FIG. 2; and FIG. 4 is another alternative construction for a portion of the apparatus of FIG. 2.

Figure 1:
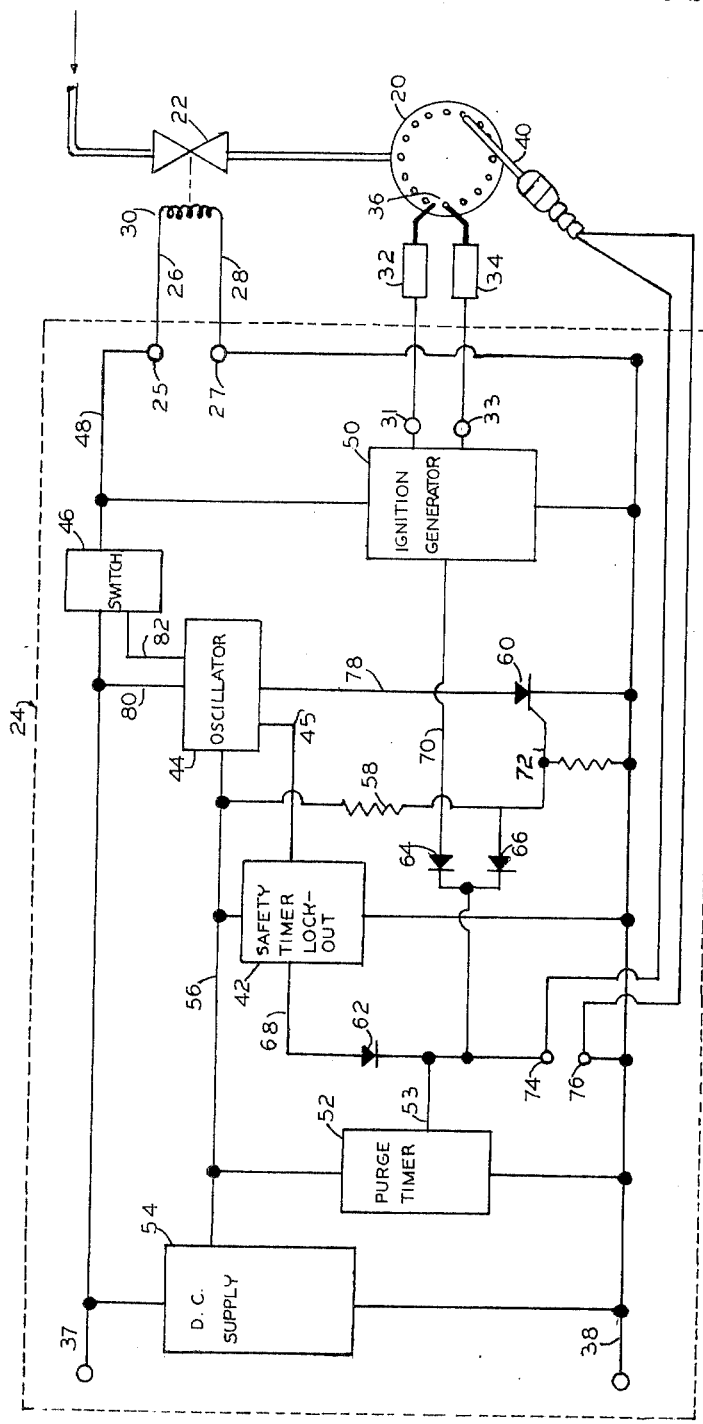
FIG. 1 is a diagram, partly pictorial and partly in block diagram form showing the environment of the method and apparatus of this invention.

In FIG. 1, a gas burner 20, of the type conventionally used in gas appliances, is supplied with an appropriate fuel gas through an automatic control valve 22.

An ignition control circuit 24, to be hereinafter described, is connected via leads 26 and 28 to the solenoid or actuating coil 30 of the valve 22. Additionally, two electrodes 32 and 34 are supplied from the control circuit 24. A spark gap 36 is formed between the ends of these two electrodes to ignite the gas from burner 20. The power supplied to circuit 24 via leads 37 and 38 is controlled by a thermostatically operated switch, not shown.

When heating is required, leads 37 and 38 supply power to circuit 24 which simultaneously energizes electrodes 32 and 34 with sufficient energy to cause a spark to jump the gap 36, and solenoid 30 to open valve 22. The spark occurring at gap 36 ignites the gas issuing at burner 20. Ignition control circuit 24 is arranged so that if flame sensor 40 is either hot or has failed in a short circuit mode when lines 37 and 38 first supply power to circuit 24 on a call for heating, neither the valve 22 may be energized to open nor the gap 36 be energized to cause sparks to occur, until the sensor 40 cools down or, if defective, is replaced.

In normal operation when the gas is ignited at burner 20, flame sensor 40, having a very high resistance when cold and a very low resistance when hot, gets hot and causes the circuit 24 to de-energize the gap 36 so that sparks do not occur after the burner 20 has thus been proven to be burning. Alternatively, if the gas issuing at burner 20 fails to ignite for any reason, sensor 40 will remain cold, with a high resistance, thereby allowing a safety timer lock-out circuit 42 to run through its period at the end of which it disables a uni-junction transistor oscillator 44 via lead 45 and keeps it disabled until power to circuit 24 via leads 37 and 38 is interrupted. When oscillator 44 is disabled, semiconductor power device 46 is rendered nonconductive and power from line 37 through to connection line 48 is cut off, thereby de-energizing both spark generator 50 and solenoid 30.

In certain applications where control circuit 24 is associated with a forced draft burner, not shown, it is necessary that both spark gap 36 and solenoid 30 be held inoperative for a fixed period of time to allow the forced draft air to purge the combustion chamber (not shown), into which the burner 20 is firing, of any combustible gasses before ignition occurs. This fixed period is commonly referred to as the pre-purge period. Prepurge timer circuit 52 via line 53 acts during the purge period to keep both spark generator 50 and solenoid 30 deenergized. Timer circuit 52 may be left out of control circuit 24 if it is not required.

Since safety timer lock-out 42, oscillator 44 and purge timer 52 require a source of direct current power for their operation, direct current supply 54 is included in control circuit 24 to rectify and filter the alternating current supplied through leads 37 and 38. In this arrangement, lead 38 is common to the alternating current source and to the negative side of DC source 54. Connection line 56 carries the positive side of DC source 54 to a lock-out circuit 42, oscillator 44, purge timer 52, and via resistor 58 to the gate of a silicon controlled rectifier (SCR) 60.

Diodes 62, 64 and 66, provide isolation between lines 68, 70 and 72, which connect circuits 42, 50 and the gate of SCR 60 respectively, to flame sensor terminal 74, the other terminal 76 being connected to common line 38.

SCR 60 is connected between oscillator 44 via lead 78 and common line 38 and acts as a latching switch to control the flow of current from DC source 54 through oscillator 44. In operation, when leads 37 and 38 supply power, upon the closing of the thermostat, the gate of SCR 60 will draw current from line 56 through resistor 58 and SCR 60 will conduct, thus allowing current to flow from line 56 through oscillator 44, line 78 and SCR 60 to line 38. When current thus flows in oscillator 44, it oscillates and its output is fed via leads 80 and 82 to semiconductor switch 46 rendering the latter conductive and thereby applying alternating current to spark generator 50 and solenoid 30 via line 48 and common line 38. However, if sensor 40 has a very low resistance when lines 37 and 38 first apply AC power to circuit 24, the current from line 56 through 58 will be mainly bypassed through diode 66 and sensor 40 and SCR 60 will not conduct, thereby preventing oscillator 44 from oscillating and in turn keeping generator 50 and solenoid 30 from being energized. When sensor 40 cools down (or is replaced, if defective) the gate of SCR 60 may draw current through resistor 58 and the normal series of functions will again occur.

During a heating cycle, sensor 40 will be kept hot, and thus at low resistance, by the flame at burner 20. In the event that the flame is extinguished for any abnormal reason, such as a fuel line interruption, a gust of air across the burner, etc., sensor 40 will cool down and its resistance will increase to a high value within a few seconds. When the resistance of sensor 40 increases sufficiently, sensor 40 will permit both spark generator 50 and lock-out circuit 42 to function again.

In this fashion an attempt is made to re-ignite burner 20 and the attempt is carried out for the duration of the safety timer and lock-out circuit 42. If burner 20 re-ignites before the end of the safety period, the burner will continue its normal heating cycle. However, if the burner 20 fails to re-ignite, the lock-out circuit 42 will act, at the end of the safety timing period, to disable oscillator 44 thereby cutting off the alternating current supply to both spark generator 50 and solenoid 30. When lock-out occurs, the control 24 remains in this condition until the alternating current supply via leads 37 and 38 is interrupted, for instance, by manually adjusting the thermostat.

Figure 2:
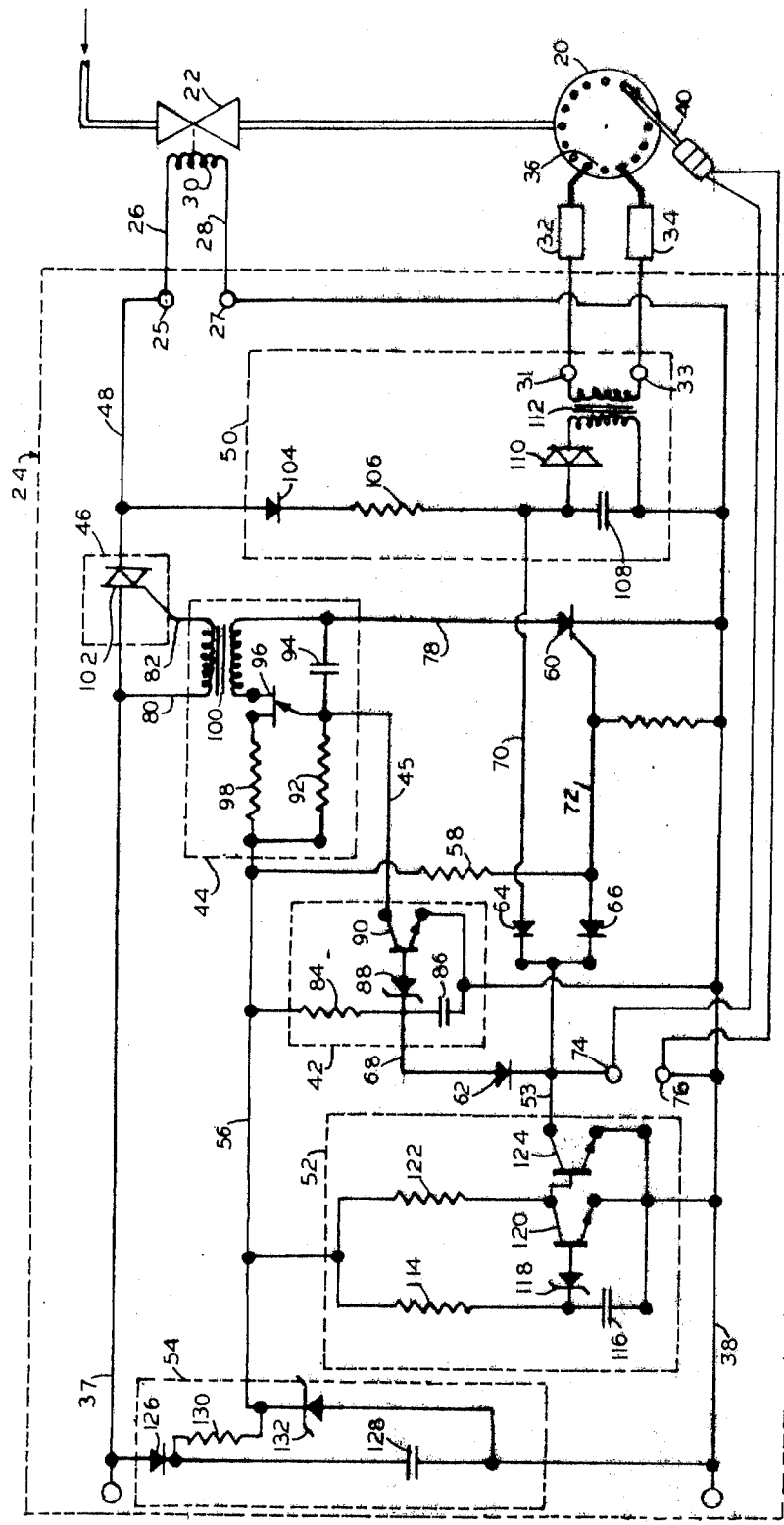
FIG. 2 is a schematic diagram illustrating apparatus made according to and utilizing the method of this invention.

In FIG. 2, there is shown the detailed circuitry of apparatus made according to and utilizing the method described for FIG. 1, like numbers for like parts having been used in FIG. 2 to simplify description. Safety timer and lock-out circuit 42 consists of resistor 84, capacitor 86, zener diode 88 and NPN transistor 90 in circuit arrangement between lines 56 and 38 wherein transistor 90 remains in a cut-off state so long as the charge on capacitor 86 is less than the voltage rating of Zener 88, but when capacitor 86 charges to the rating of Zener 88 it allows the base of transistor 90 to draw current from line 56 through resistor 84 and Zener 88 and transistor 90 saturates. Since the junction of resistor 84, capacitor 86 and the cathode of Zener 88 is connected via lead 68, through the anode and cathode of diode 62 and thence through sensor 40 to common line 38, the charging current to capacitor 86 is by-passed when sensor 40 is hot and hence capacitor 86 may charge only when sensor 40 is cold. Thus, the safety timer and lock-out circuit 42 is disabled or allowed to operate in response to the state of sensor 40.

Unijunction transistor oscillator 44 consists of resistor 92 capacitor 94, unijunction transistor 96, resistor 98 and pulse transformer 100 in circuit arrangement between line 56 and the anode of SCR 60 wherein the oscillator output from the secondary winding of pulse transformer 100 is connected via leads 80 and 82 to the anode 1 and gate respectively of semiconductor switch 46, which is bi-directional thyristor 102 and whereby the output of oscillator 44 causes thyristor 102 to be rendered bi-directionally conductive. Further, the junction of resistor 92, capacitor 94 and the emitter of transistor 96 is connected via lead 45 to the collector of transistor 90 in lock-out circuit 42, whereby oscillator 44 will oscillator and have an output when transistor 90 is in the cut-off state, and will not oscillate and has no output when transistor 90 is in the "on" or saturated state, SCR 60 must be in the conductive state for oscillator 44 to be able to function.

Semiconductor switch 46, consists of thyristor 102 which is bi-directionally conductive when oscillator 44 has an output, thereby connecting line 37 to line 48 and supplying AC power to solenoid 30 and spark generator 50; and which is non-conductive when oscillator 44 has no output, thereby cutting off line 37 from line 48 and interrupting the AC power supply to solenoid 30 and spark generator 50. Spark generator 50 consists of rectifier diode 104, resistor 106, capacitor 108, five layer diode 110, and high voltage transformer 112, in circuit arrangement between lines 48 and 38 whereby capacitor 108 receives some charge through diode 104 and resistor 106 each half cycle of the AC power supply when line 48 is positive, these charges accumulating until the charge on capacitor 108 reaches the break-down voltage of five-layer diode 110, at which point diode 110 conducts with a very small voltage drop between its terminals, thereby rapidly discharging capacitor 108, through the primary winding of transformer 112 with the consequent induction of a very high voltage in its secondary winding. Since the secondary winding is connected to selectrode 32 and 34, this high voltage will energize the electrodes and a spark will jump gap 36.

Further, since the junction of resistor 106, diode 110 and capacitor 108 is connected via line 70 and through the anode and cathode of diode 64 and sensor 40 to line 38, the charging current to capacitor 108 will be by-passed to line 38 when sensor 40 is hot and will not be by-passed when sensor 40 is cold, thereby allowing spark generator 50 to operate when sensor 40 is cold and preventing it from operating when sensor 40 is hot.

Pre-purge timer 52 consists of resistor 114, capacitor 116, Zener diode 118, NPN transistor 120, resistor 122 and NPN transistor 124 in circuit arrangement between lines 56 and 38 wherein, when these lines are first energized, transistor 124 is saturated because transistor 120 is cut off due to Zener 118 not conducting, since capacitor 116 is charging from zero voltage through resistor 114 and takes a fixed period of time to charge to the Zener rating of Zener 118. This charging time determines the pre-purge period. During the pre-purge period, since transistor 124 is "on," or in the saturated state, the collector-emitter voltage of the transistor is very low (less than 0.2 volt), and further since the collector of transistor 124 is connected via line 53 to terminal 74 of sensor 40 and the emitter to line 38, a low resistance bypass path is provided by transistor 124 across the flame sensor terminals, thereby preventing lock-out circuit 42, spark generator 50, and SCR 60 from functioning. When the pre-purge period ends, transistor 120 saturates and causes transistor 124 to cut-off, thereby allowing circuits 42 and 50 and SCR 60 to function normally. If the pre-purge is not required, circuit 52 simply may be deleted in its entirety from control circuit 24. Direct current supply 54 consists of rectifier diode 126, filter capacitor 128, voltage dropping resistor 130 and voltage stabilizing Zener diode 132 in circuit arrangement between AC power leads 37 and 38 whereby a filtered, stabilized DC voltage is connected via positive line 56 and common line 38 to other circuits, line 56 being connected to the junction of resistor 130 and Zener 132.

In FIG. 3 is shown the schematic diagram of an alternate spark generator 150 which may be used in place of spark generator 50 of FIG. 2, when the alternating current power supplied via leads 37 and 38 is low voltage, that is, nominally 30 volts R.M.S., or less. Like numbers have been used on like parts in FIGS. 2 and 3 for simplicity of explanation. In FIG. 3, capacitor 108 is charged from a voltage doubling circuit consisting of capacitor 134, rectifier diodes 136 and 138 and resistor 140, wherein, when line 38 is positive, capacitor 134 charges with the polarity shown, to the peak value of the AC voltage between lines 48 and 38, and, on the following half cycle of the AC voltage, when line 48 is positive, the incoming AC voltages adds to the charge on capacitor 134 and tends to charge capacitor 108 to twice the peak value of the AC voltage through diode 138 and resistor 140, the values of resistor 140 and capacitor 108 determining how many cycles of the voltage are required to charge capacitor 108 to the breakdown voltage of five-layer diode 110. When the charge on capacitor 108 reaches the breakdown voltage of five-layer diode 110, capacitor 108 is discharged through the primary of transformer 112 and a spark will occur in gap 36 as previously described. The operation of generator 150 is controlled by the hot or cold state of sensor 40 since line 70 is connected to the junction of resistor 140, diode 110 and capacitor 108 and this arrangement functions in the same fashion as previously described for generator 50.

In FIG. 4 is shown the schematic diagram of yet another alternate spark generator 250 which may be used in place of spark generator 50 in FIG. 2 when the alternating current power supplied via leads 37 and 38 is low voltage; that is 30 volts R.M.S. or less. Like numbers have been used on like parts in FIGS. 2 and 4 for simplicity of explanation. In FIG. 4, capacitor 108 is charged from a voltage tripling circuit consisting of capacitor 142, rectifier diode 144, capacitor 146, diode 148, diode 149 and resistor 152, wherein, when line 38 is positive, capacitors 142 and 146 charge simultaneously, with the polarities shown, through diodes 144 and 148 respectively to the peak value of the AC voltage between lines 48 and 38, and, on the following half cycle when line 48 is positive, the charges on capacitors 144 and 146 add to the voltage between lines 48 and 38 tend to charge capacitor 108 through diode 149 to three times the peak value of the AC voltage between lines 48 and 38 As previously described, when the charge on capacitor 108 reaches the breakdown voltage of diode 110 capacitor 108 is discharged through the primary of transformer 112 and a spark will occur in gap 36. Since line 70 is connected to the junction of resistor 152, five layer diode 110 and capacitor 108, the operation of generator 250 will be controlled by the state of sensor 40.

In the preceding descriptions, spark generator 50 is suitable for use with alternating current sources of 115 volts R.M.S. or higher, and alternate spark generators 150 and 250 are suitable for use with alternating current sources of 30 volts R.M.S. or lower. These spark generators are exceptionally simple in the composition of their components, the simplicity resulting from the characteristics of five-layer diode 110 used in all three generators to discharge capacitor 108 into the primary winding of transformer 112. Some of the characteristics are as follows: first, diode 110 always changes from a non-conducting state to a fully conducting state at a certain fixed voltage, nominally 50 volts, across its terminals, and thus the charge on capacitor 108 is the same each time diode 110 goes into conduction; second, diode 110 changes from non-conduction to full conduction in a fraction of a microsecond, thereby keeping the power dissipated in it to a very small value during the turn-on period with the result that this diode can carry large magnitude pulses of current; third, the saturation voltage drop across the terminals of diode 110 is small, being of the order of 1 volt, thus allowing the maximum transfer of the energy stored in capacitor 108 into the primary winding of transformer 112; and fourth, since five-layer diode 110 is a two terminal device, it requires no triggering pulse to turn it on, as do such semi-conductors as the silicon controlled rectifier, and requires fewer circuit elements than, for example, a silicon controlled rectifier.

While a single form of the invention with variation has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. For the control and ignition of a burner having an electrically operable valve controlling the flow of fuel thereto, a circuit combining the control over the operation of the burner and with provision of a spark voltage generator of the capacitor-discharge type, comprising, a source of alternating current power means to convert said power to a direct current control voltage, a first semiconductor switch means in one line of said alternating current power thereby to control the flow of alternating current to said valve and to said spark generator, a unijunction transistor oscillator having means connecting its output to the gate-portion of said first semiconductor switch means thereby to render the latter conductive while said oscillator is operating, said oscillator deriving operating voltage from said control voltage through a second semiconductor switch means, a flame sensor adjacent the burner having a high impedance in the absence of flame and a low impedance in the presence of flame, and having connected across it the capacitor of a resistance capacitance transistor time delay means, the gate portion of said second semiconductor switch means, and the pulse triggering capacitor of said spark generator, a resistor capacitor transistor time delay means deriving its operating voltage from said control voltage and having a high impedance output during its timing interval and a low impedance output thereafter, said delay output having connected across it the oscillator trigger capacitor in series with said second semiconductor switch means.

2. For the control and ignition of a burner having an electrically operable valve controlling the flow of fuel thereto, a circuit combining the control over the operation of the burner and with provision of a spark voltage generator of the capacitor discharge type, comprising, a source of alternating current power, means to convert said power to a direct current control voltage, a first semiconductor switch means in one line of said alternating current power thereby to control the flow of alternating current to said valve and to said spark generator, a unijunction transistor oscillator having means connecting its output to the gate-portion of said first semiconductor switch means thereby to render the latter conductive while said oscillator is operating, said oscillator deriving operating voltage from said control voltage through a second semiconductor switch means, a first resistor capacitor transistor time delay means, deriving its operating voltage from said control voltage, and having a high impedance output during its timing interval and a low impedance output thereafter, said first delay output having connected across it, the capacitor of a second resistance capacitance transistor time delay means, the gate portion of said second semiconductor switch means, the pulse triggering capacitor of said spark generator, and a flame sensor adjacent the burner which has a high impedance in the absence of flame and a low impedance in the presence of flame, a second resistor capacitor transistor time delay means deriving its operating voltage from said control voltage and having a high impedance output during its timing interval and a low impedance output thereafter, said second delay output having connected across it the oscillator trigger capacitor in series with said second semiconductor switch means.

References Cited

UNITED STATES PATENTS

| | | | |
|---|---|---|---|
| 2,011,028 | 8/1935 | Ballentine | 431—68 |
| 3,238,992 | 3/1966 | Forbes | 431—69 X |
| 3,304,989 | 2/1967 | Alexandria et al. | 431—71 |
| 3,318,358 | 5/1967 | Potts | 431—69 |
| 3,336,506 | 8/1967 | Frank | 317—96 |
| 3,338,288 | 8/1967 | Walker | 431—71 |
| 3,245,456 | 4/1966 | Cox | 431—31 |
| 3,306,339 | 2/1967 | Barton et al. | 431—26 |
| 3,393,037 | 7/1968 | Giuffrida et al. | 431—24 |

FOREIGN PATENTS 902,175 7/1962 Great Britain.

EDWARD G. FAVORS, Primary Examiner

U.S. Cl. X.R.

431—31, 68